US012643242B2

(12) United States Patent
Farquhar et al.

(10) Patent No.: US 12,643,242 B2
(45) Date of Patent: Jun. 2, 2026

(54) SYSTEMS AND METHODS FOR A CLEANING PROCESS OF TARGETED SURFACES

(71) Applicant: Ford Global Technologies, LLC, Dearborn, MI (US)

(72) Inventors: Gary David Farquhar, Farmington Hills, MI (US); Mitchell Goepel, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 18/639,304

(22) Filed: Apr. 18, 2024

(65) Prior Publication Data

US 2025/0326133 A1     Oct. 23, 2025

(51) Int. Cl.
*B25J 11/00* (2006.01)
*B25J 9/16* (2006.01)

(52) U.S. Cl.
CPC ........... B25J 11/0065 (2013.01); B25J 9/161 (2013.01); B25J 9/163 (2013.01); B25J 9/1664 (2013.01)

(58) Field of Classification Search
None
See application file for complete search history.

(56) References Cited

U.S. PATENT DOCUMENTS

| | | | | |
|---|---|---|---|---|
| 2018/0326591 | A1* | 11/2018 | Häusler | G01B 11/24 |
| 2021/0323167 | A1 | 10/2021 | Hemes et al. | |
| 2022/0126319 | A1 | 4/2022 | Richardson et al. | |
| 2022/0288774 | A1* | 9/2022 | Gong | B25J 9/1664 |
| 2025/0025980 | A1* | 1/2025 | Neinaber | B24B 27/0038 |
| 2025/0242466 | A1* | 7/2025 | Eckel | B24B 41/002 |
| 2025/0259290 | A1* | 8/2025 | Floeder | G01N 21/9515 |

FOREIGN PATENT DOCUMENTS

WO       2022162417       8/2022

OTHER PUBLICATIONS

Jianghai Qian, CFD Modeling of Ventilation and Dust Flow Behavior in Polishing and the Design of an Innovative Wet Dust Removal System, International Journal of Environmental Research and Public Health (Year: 2020).*
Vadim Zaiser, Grinding Process Analysis based on Material Removal . . . accessed through https://machines.anca.com/e-sharp-news/june-2022/grinding-process-analysis-based-on-mrr#:~: text= A%20higher%20MRR%20means%20more,second%20rate%20mm3/ s. (Year: 2022).*
Eastern Tennessee State University, Feedrate Commands and Economics, accessed through https://faculty.etsu.edu/hemphill/entc3710/ nc-prog/nc-03-05.htm#:~: text=For%20milling%2C%20the% 20material%20removal,the%20spindle%20speed%20(RPM). (Year: 2002).*

* cited by examiner

*Primary Examiner* — Wade Miles
(74) *Attorney, Agent, or Firm* — Burris Law, PLLC

(57) ABSTRACT

A method including the receipt of a set of data associated with a surface condition of a vehicle, a determination of an extent of an instance of one or more imperfections upon a surface of the vehicle made by an artificial intelligence system, and an update to a pathway followed by one or more robots based on the determination of the extent of the instance of the one or more imperfections. The determination of the extent of the instance of the one or more imperfections causes the one or more robots to initiate a remediation action to a targeted portion of the surface of the vehicle to resolve the instance of the one or more imperfections.

20 Claims, 5 Drawing Sheets

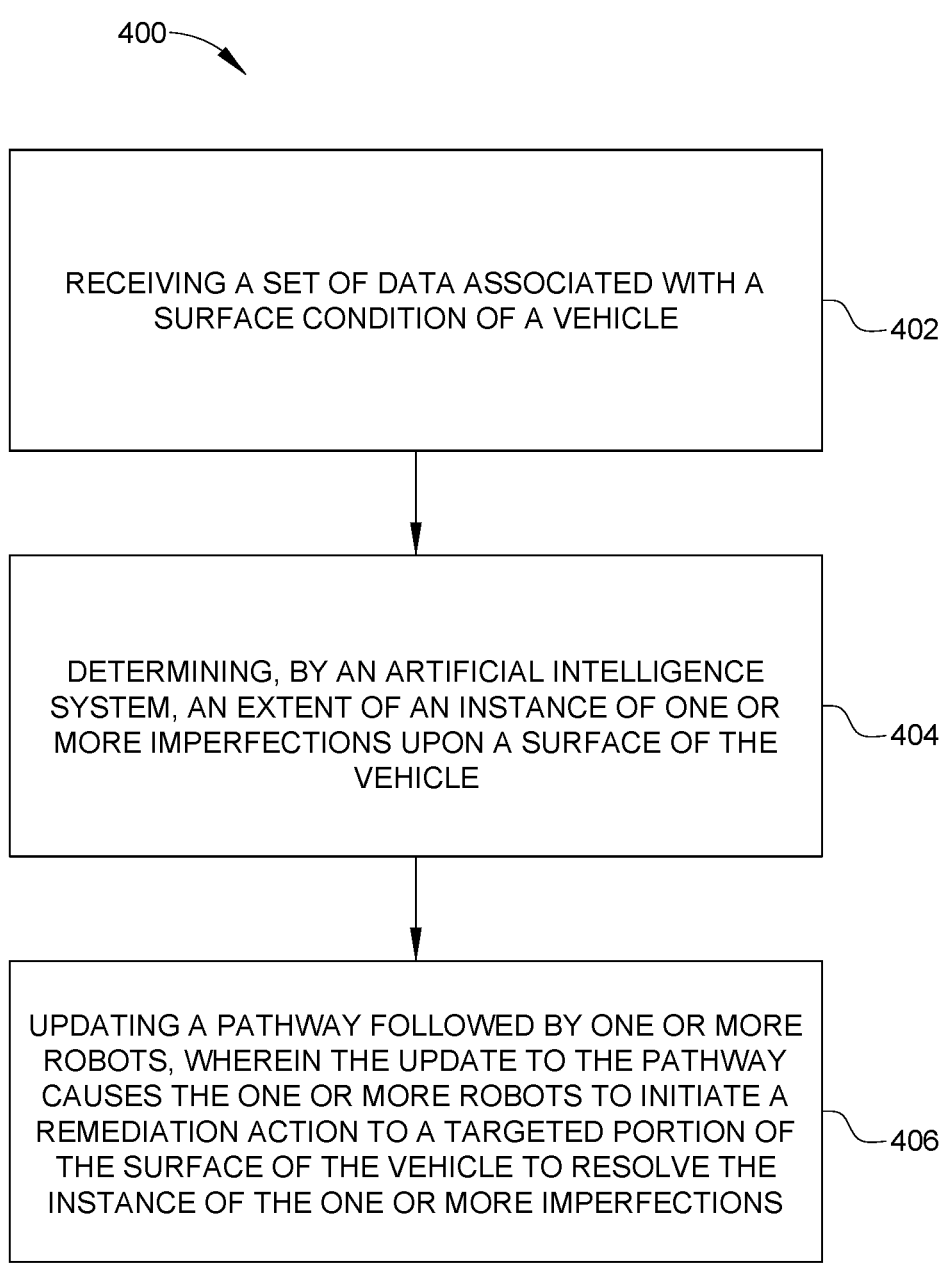

400

RECEIVING A SET OF DATA ASSOCIATED WITH A
SURFACE CONDITION OF A VEHICLE                    402

DETERMINING, BY AN ARTIFICIAL INTELLIGENCE
SYSTEM, AN EXTENT OF AN INSTANCE OF ONE OR
MORE IMPERFECTIONS UPON A SURFACE OF THE
VEHICLE                                          404

UPDATING A PATHWAY FOLLOWED BY ONE OR MORE
ROBOTS, WHEREIN THE UPDATE TO THE PATHWAY
CAUSES THE ONE OR MORE ROBOTS TO INITIATE A
REMEDIATION ACTION TO A TARGETED PORTION OF
THE SURFACE OF THE VEHICLE TO RESOLVE THE
INSTANCE OF THE ONE OR MORE IMPERFECTIONS        406

FIG. 4

SYSTEMS AND METHODS FOR A CLEANING PROCESS OF TARGETED SURFACES

FIELD

The present disclosure relates to systems and methods directed toward a paint application process that a vehicle undergoes during a manufacturing production. More specifically, the present disclosure relates to controlling operations of a cleaning method associated with the paint application process.

BACKGROUND

The statements in this section merely provide background information related to the present disclosure and may not constitute prior art.

As a vehicle travels through a typical automotive paint facility, the surface of the vehicle may be prepared for painting at a first workstation before traveling to other workstations. As the vehicle travels through each of the other workstations the vehicle can be exposed to build-up on the surface of the vehicle, even though there are typically periodic cleaning workstations among the workstations.

The present disclosure addresses these and other issues related to systems and methods for a paint application process.

SUMMARY

This section provides a general summary of the disclosure and is not a comprehensive disclosure of its full scope or all of its features.

The present disclosure provides a method comprising: receiving, from a first inspection workstation, a first set of data associated with a surface condition of a vehicle; determining, by an artificial intelligence system, an extent of a first instance of one or more imperfections upon a surface of the vehicle based on the first set of data; and updating a pathway followed by one or more robots based on the determination of the extent of the first instance of the one or more imperfections, wherein the update to the pathway causes the one or more robots to initiate a remediation action to a targeted portion of the surface of the vehicle to resolve the first instance of the one or more imperfections; wherein the first set of data includes an amount of imperfections associated with the first instance of the one or more imperfections, a size of each imperfection of the first instance of the one or more of the imperfections, a location of each imperfection of the first instance of the one or more imperfections, or a combination thereof; further comprising: predicting, by the artificial intelligence system, an amount of debris that will be generated by the remediation action; wherein the update to the pathway followed by the one or more robots is further based on the predicted amount of debris; further comprising: receiving, from a second inspection workstation, a second set of data associated with the surface condition of the vehicle; determining, by the artificial intelligence system, an extent of a second instance of one or more imperfections upon the surface of the vehicle based on the second set of data and a predicted amount of debris that will be generated by the remediation action; and updating the pathway followed by the one or more robots based on the determination of the extent of the second instance of the one or more imperfections, wherein the update to the pathway causes the one or more robots to initiate the remediation action to at least one of the targeted portion or another targeted portion of the surface of the vehicle to resolve the second instance of the one or more imperfections; wherein the second set of data includes an amount of imperfections associated with the second instance of the one or more imperfections, a size of each imperfection of the second instance of the one or more of the imperfections, a location of each imperfection of the first instance of the one or more imperfections, or a combination thereof; and wherein the remediation action includes a sanding process, a polishing process, or a combination thereof, and wherein the first instance and the second instance of the one or more imperfections comprises a portion of the surface of the vehicle that include excess dust, excess dirt, excess debris, or a combination thereof.

The present disclosure provides a system comprising: an infrastructure system configured to: receive, from a first inspection workstation, a first set of data associated with a surface condition of a vehicle, determine, by an artificial intelligence system, an extent of a first instance of one or more imperfections upon a surface of the vehicle based on the first set of data, update a pathway followed by one or more robots based on the determination of the extent of the first instance of the one or more imperfections; the first inspection workstation configured to: identify the first set of data, send the first set of data to the infrastructure system; and the one or more robots configured to: initiate a remediation action to a targeted portion of the surface of the vehicle to resolve the first instance of the one or more imperfections based on the update to the pathway; wherein the first set of data includes an amount of imperfections associated with the first instance of the one or more imperfections, a size of each imperfection of the first instance of the one or more imperfections, a location of each imperfection of the first instance of the one or more imperfections, or a combination thereof; wherein the infrastructure system is further configured to: predict, by the artificial intelligence system, an amount of debris that will be generated by the remediation action; wherein the update to the pathway followed by the one or more robots is further based on the predicted amount of debris; wherein the infrastructure system is further configured to: receive, from a second inspection workstation, a second set of data associated with the surface condition of the vehicle; determine, by the artificial intelligence system, an extent of a second instance of one or more imperfections upon the surface of the vehicle based on the second set of data and a predicted amount of debris that will be generated by the remediation action; and update the pathway followed by the one or more robots based on the determination of the extent of the second instance of the one or more imperfections, wherein the update to the pathway causes the one or more robots to initiate the remediation action to at least one of the targeted portion or another targeted portion of the surface of the vehicle to resolve the second instance of the one or more imperfections; wherein the second set of data includes an amount of imperfections associated with the second instance of the one or more imperfections, a size of each imperfection of the second instance of the one or more imperfections, a location of each imperfection of the first instance of the one or more imperfections, or a combination thereof; and wherein the remediation action includes a sanding process, a polishing process, or a combination thereof, and wherein the first instance and the second instance of the one or more imperfections comprises a portion of the surface of the vehicle that include excess dust, excess dirt, excess debris, or a combination thereof.

The present disclosure provides one or more non-transitory computer-readable media storing processor-executable instructions that, when executed by at least one processor, cause the at least one processor to: receive, from a first inspection workstation, a first set of data associated with a surface condition of a vehicle; determine, by an artificial intelligence system, an extent of a first instance of one or more imperfections upon a surface of the vehicle based on the first set of data; and update a pathway followed by one or more robots based on the determination of the extent of the first instance of the one or more imperfections, wherein the update to the pathway causes the one or more robots to initiate a remediation action to a targeted portion of the surface of the vehicle to resolve the first instance of the one or more imperfections; wherein the first set of data includes an amount of imperfections associated with the first instance of the one or more imperfections, a size of each imperfection of the first instance of the one or more imperfections, a location of each imperfection of the first instance of the one or more imperfections, or a combination thereof; wherein the at least one processor is further caused to: predict, by the artificial intelligence system, an amount of debris that will be generated by the remediation action, wherein the update to the pathway followed by the one or more robots is further based on the predicted amount of debris; wherein the at least one processor is further caused to: receive, from a second inspection workstation, a second set of data associated with the surface condition of the vehicle; determine, by the artificial intelligence system, an extent of a second instance of one or more imperfections upon the surface of the vehicle based on the second set of data and a predicted amount of debris that will be generated by the remediation action; and update the pathway followed by the one or more robots based on the determination of the extent of the second instance of the one or more imperfections, wherein the update to the pathway causes the one or more robots to initiate the remediation action to at least one of the targeted portion or another targeted portion of the surface of the vehicle to resolve the second instance of the one or more imperfections; wherein the second set of data includes an amount of imperfections associated with the second instance of the one or more imperfections, a size of each imperfection of the second instance of the one or more imperfections, a location of each imperfection of the first instance of the one or more imperfections, or a combination thereof; and wherein the remediation action includes a sanding process, a polishing process, or a combination thereof, and wherein the first instance and the second instance of the one or more imperfections comprises a portion of the surface of the vehicle that include excess dust, excess dirt, excess debris, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a flowchart illustrating an example method for a paint application process in accordance with various implementations.

Figure 1:
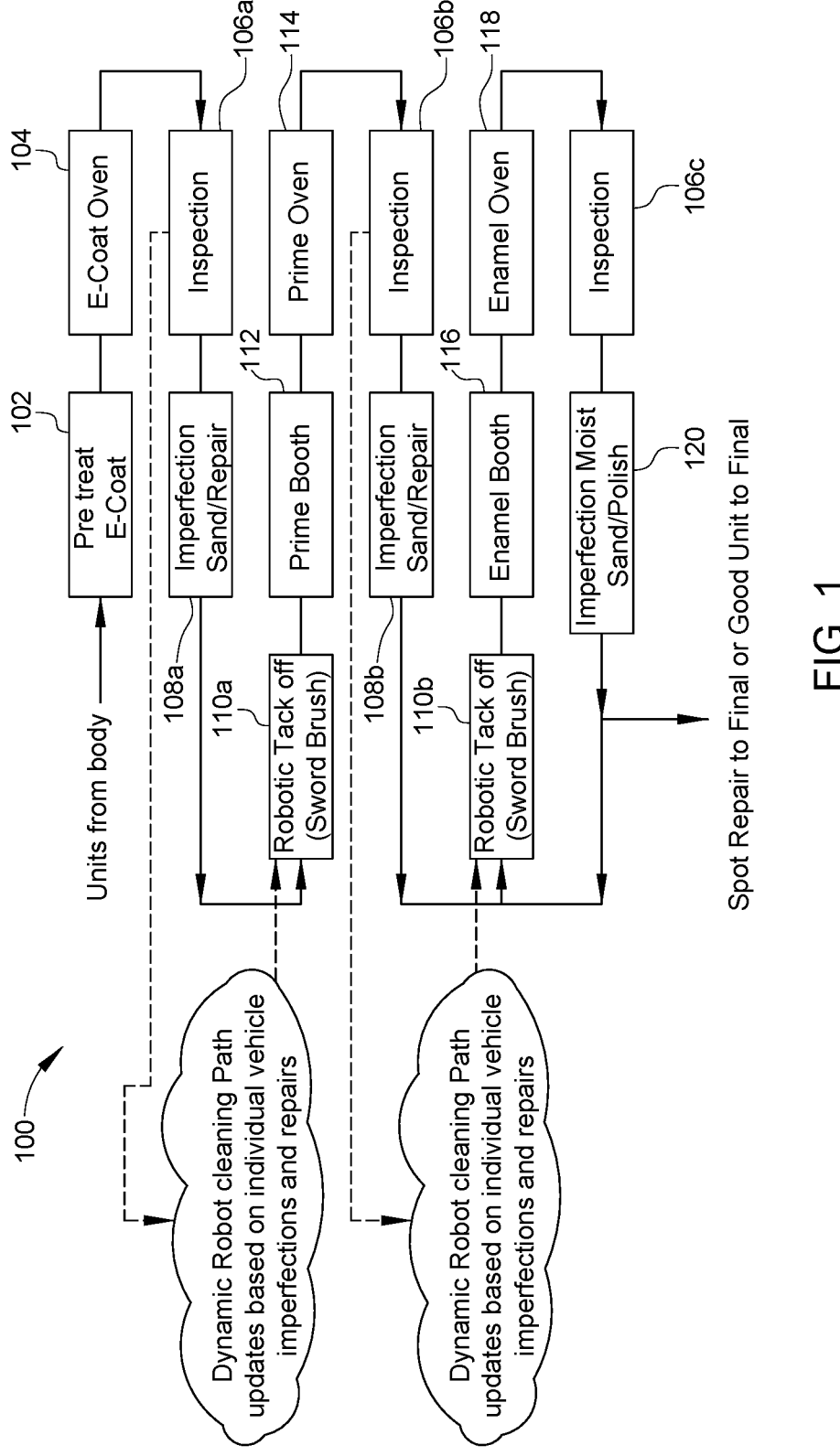
FIG. 1 depicts an overall process flow of an example method in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a means for a reduction in build-up upon a surface of a vehicle as the vehicle travels through a manufacturing process. For example, because typical paint application processes allow for the build-up to compound upon the surface of the vehicle during the manufacturing process, imperfections may arise downstream in the manufacturing process. By implementing one or more means disclosed in the present disclosure, a source of immediate feedback is provided that is associated with the location(s) of build-up on the surface of the vehicle. As an example, the source of immediate feedback confirms where build-up is predicted to be located on the surface of the vehicle. In both instances, wherein the build-up location is specifically indicated and/or when the build-up location is predicted, an indication of an area upon the surface of the vehicle that may require extra cleaning is identified.

Additionally, based on the determination of the indication of the area upon the surface of the vehicle that may require extra cleaning, one or more corrective actions can be taken that were not originally a part of a predefined paint application process. Furthermore, the determination of the indication of the area upon the surface of the vehicle that may require extra cleaning provides an increased number of data points associated with the measurement and inspection of the vehicle. Also, based on the determination of the indication of the area upon the surface of the vehicle that may require extra cleaning, a higher percentage of build-up that could cause imperfections further along in the predefined paint application process is removed. In various examples, the determination(s) allows for an optimized paint application process as described in more detail herein.

FIG. 1 shows an example pathway 100 associated with a paint application process that a vehicle (e.g., the vehicle 202 shown in FIG. 2) undergoes as part of an overall manufacturing process. However, it is understood that the example pathway 100 associated with the paint application process is not required to be part of the overall manufacturing process and instead can be an isolated process and/or part of any other type of overall process. The example pathway 100 is generally comprised of one or more workstations. For example, the example pathway 100 can include a pretreatment electrocoating ("e-coating") workstation 102, an e-coating oven workstation 104, a plurality of inspection workstations 106*a*-106*c*, a duality of imperfection sand/repair workstations 108*a*, 108*b*, a duality of robotic tack-off workstations 110*a*, 110*b*, a prime booth workstation 112, a prime oven workstation 114, an enamel booth workstation 116, an enamel oven workstation 118, and an imperfection moist sand/polish workstation 120. However, fewer or additional workstations of the same or different type are contemplated.

Figure 2:
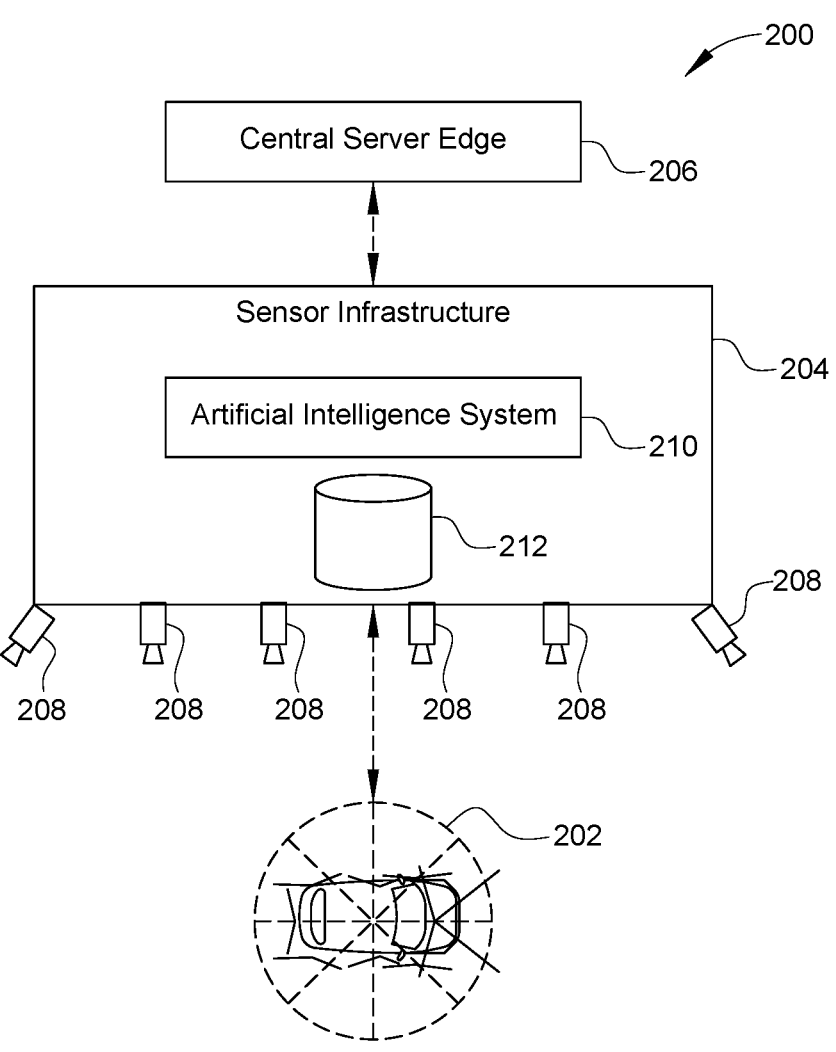
FIG. 2 depicts an overall system associated with a workstation in accordance with various implementations.

With reference to FIG. 2, an example workstation 200 of the one or more workstations (e.g., the pretreatment e-coating workstation 102, the e-coating oven workstation 104, the plurality of inspection workstations 106a-106c, the duality of imperfection sand/repair workstations 108a, 108b, the duality of robotic tack-off workstations 110a, 110b, the prime booth workstation 112, the prime oven workstation 114, the enamel booth workstation 116, and/or the imperfection most sand/polish workstation 118) is illustrated. For example, FIG. 2 illustrates the vehicle 202 traveling through the example workstation 200. The example workstation 200 generally includes at least one sensor infrastructure 204 connected to at least a central edge server 206. For example, the central edge server is connected to the at least one sensor infrastructure 204 by a wireless means, a wired means, or a combination thereof.

The central edge server 206 is configured to utilize sensor data received from the at least one sensor infrastructure 204 to track a progression of the vehicle 202 through the paint application process. The at least one sensor infrastructure 204 includes a set of infrastructure sensors 208 such as, for example, a two-dimensional (2D) camera, a three-dimensional (3D) camera, an infrared sensor, a radar scanner, a laser scanner, a light detection and ranging (LIDAR) sensor, an ultrasonic sensor, among others. The set of infrastructure sensors 208 monitors the progression of the vehicle 202 through the paint application process and/or monitors build-up upon the surface of the vehicle 202. It is understood, however, that other characteristics and/or operations associated with the vehicle 202 can be monitored as well.

Additionally, the central edge server 206 is configured to utilize an artificial intelligence system 210, that is included within the central edge server 206, to optimize the paint application process. For example, in an instance wherein the artificial intelligence system 210 determines that there is an excess level of build-up (e.g., debris), and/or predicts there is likely to be a subsequent excess level of build-up, upon the surface of the vehicle 202, the artificial intelligence system 210 can adjust predefined robot cleaning paths of one or more robots (not shown) to provide additional cleaning to identified areas upon the surface of the vehicle 202. For example, highlighted areas (e.g., a plurality of imperfections 300 shown in FIG. 3) correspond to areas upon the surface of the vehicle 202 that have an excess level of build-up or is likely to have a subsequent excess level of build-up. For example, the artificial intelligence system 210 can adjust the predefined robot cleaning paths of the one or more robots to provide additional cleaning to the highlighted areas upon the surface of the vehicle 202 based on at least the sensor data. As another example, the artificial intelligence system 210 can adjust the predefined robot cleaning paths of the one or more robots to provide additional cleaning to the highlighted areas upon the surface of the vehicle 202 by causing the central edge server 206 to transmit one or more instructions and/or one or more signals to the one or more robots. As an additional example, the artificial intelligence system 210 can be internal (e.g., as shown in FIG. 2) to the central edge server 206 or external relative to the central edge server 206 (e.g., within an infrastructure system (not shown) that the central edge server 206 may be configured to communicate with).

Referring back to FIG. 1, the vehicle 202 can enter the paint application process by beginning at the pretreatment e-coating workstation 102. The pretreatment e-coating workstation 102 is a workstation that is configured to prepare the surface of the vehicle 202 for painting. For example, at the pretreatment e-coating workstation 102, the surface of the vehicle 202 is first cleaned and a phosphate is applied to prepare the surface of the vehicle 202 for application of an e-coat. It is understood that the pretreatment e-coating workstation 102 can clean the surface of the vehicle 202 any number of times. For example, the central edge server 206 can cause for the pretreatment e-coating workstation 102 to clean the surface of the vehicle 202 based on the sensor data received from the at least one sensor infrastructure 204 associated with the pretreatment e-coating workstation 102. As another example, the sensor data received from the at least one sensor infrastructure 204 associated with the pretreatment e-coating workstation 102 is based on the one or more images acquired by the set of infrastructure sensors 208 associated with monitoring the progression of the vehicle 202 through the pretreatment e-coating workstation 102.

It is also understood that the pretreatment e-coating workstation 102 can apply any material to prepare the surface of the vehicle 202 for application of the e-coat. Once the surface of the vehicle 202 is cleaned and the phosphate is applied, one or more coatings are applied to the pretreated surface of the vehicle 202 in an electrobath (e.g., the e-coating process). For example, the electrobath can comprise a majority percentage of deionized water (e.g., 80-90%) and a minimum percentage of paint solids (e.g., 10-20%). It is understood that the electrobath can comprise different percentages of the deionized water and paint solids. It is also understood that the electrobath can comprise any material mixed with any type of water. A post-rinsing process can occur after the electrobath to remove any excess paint residue to maintain paint uniformity across the surface of the vehicle 202.

The vehicle 202 then progresses to the e-coating oven workstation 104. The e-coating oven workstation 104 is a workstation that is configured to cure the paint film applied to the surface of the vehicle 202 by baking the surface of the vehicle 202. For example, the bake time can be any duration (e.g., 20 minutes). As another example, the baking process can occur at any temperature (e.g., 375 degrees Fahrenheit). As an additional example, the central edge server 206 can cause the e-coating oven workstation 104 to vary temperatures of the baking process and/or bake times based on the sensor data received from the at least one sensor infrastructure 204 associated with the e-coating oven workstation 104. As another example, the sensor data received from the at least one sensor infrastructure 204 associated with the e-coating oven workstation 104 is based on the one or more images acquired by the set of infrastructure sensors 208 associated with monitoring the progression of the vehicle 202 through the e-coating oven workstation 104.

The vehicle 202 can further progress to a first inspection workstation 106a of the plurality of inspection workstations 106a-106c. The first inspection workstation 106a of the plurality of inspection workstations 106a-106c is configured to perform an inspection of the surface of the vehicle 202. Additionally, the inspection includes the collection of one or more images acquired by the set of infrastructure sensors 208. Furthermore, the central edge server 206 is configured to generate one or more records associated with a number, size, and/or location of any imperfection(s) (e.g., one or more imperfections 300) on the surface of the vehicle. For example, the imperfections can be an excessive build-up of material upon the surface of the vehicle 202, an actual imperfection associated with the surface of the vehicle 202, or a combination thereof, among other imperfections. As an example, the central edge server 206 is also configured to generate one or more records associated with a number, size, and/or location of any imperfections on the surface of the vehicle 202 based at least on the sensor data associated with the one or more images acquired by the set of infrastructure sensors 208.

Figure 3:
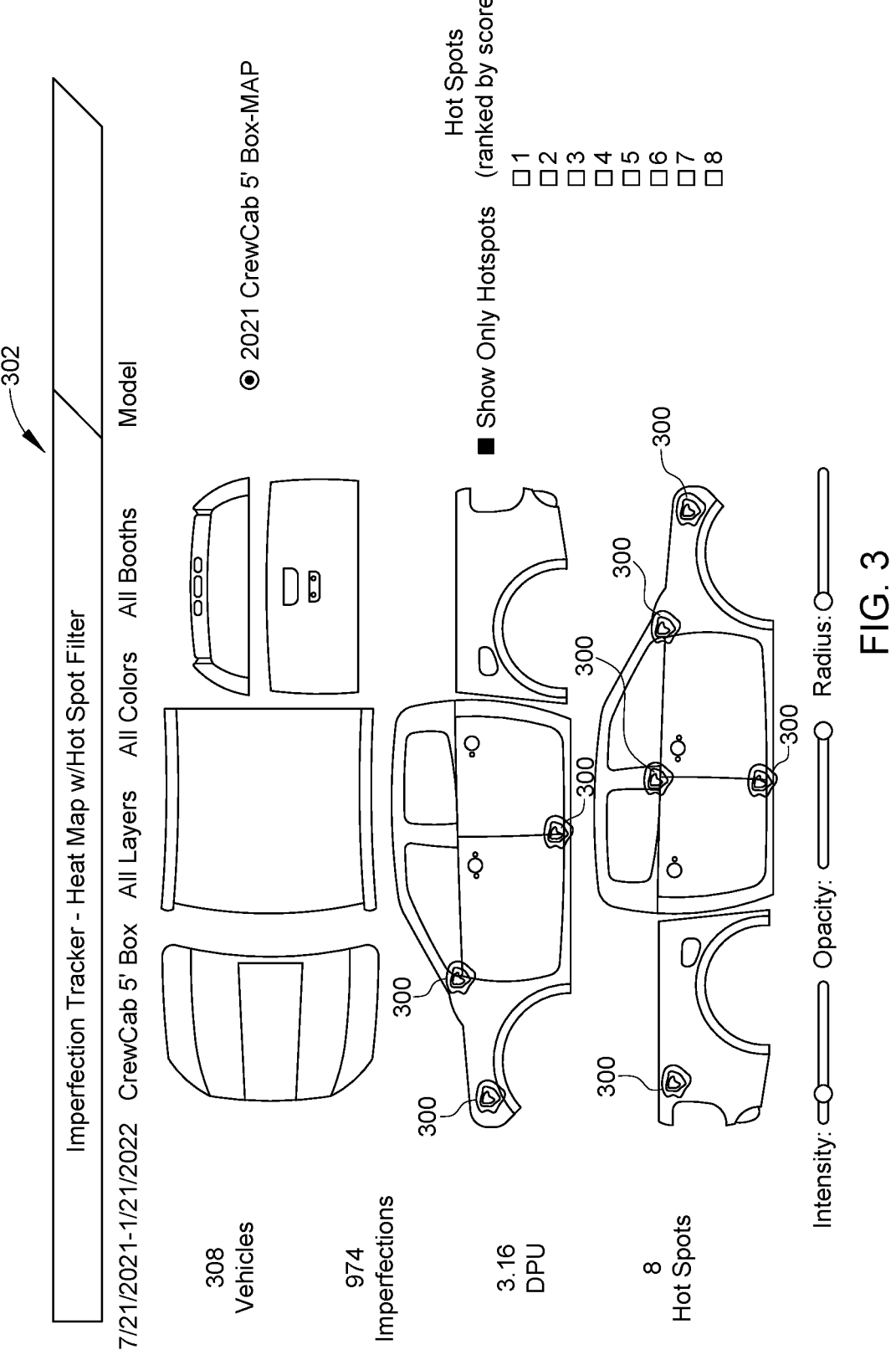
FIG. 3 illustrates imperfections detected by an imperfection detection system in accordance with various implementations.

For example, the one or more images acquired by the set of infrastructure sensors 208 can generate a heat map 302, as shown in FIG. 3, that highlights the plurality of imperfections 300. As another example, the heat map 302 can show the number of imperfections (e.g., "8 hot spots") and can indicate a degree of each of the one or more imperfections 300 by varying intensity, opacity, and/or radius of the displayed one or more imperfections 300. The heat map 302 can be configured to also rank each of the one or more imperfections 300 by the degree of the imperfection or by any other metric, for example.

Referring back to FIG. 2, the artificial intelligence system 210 is configured to determine an extent of the imperfections on the surface of the vehicle 202. For example, the artificial intelligence system 210 is configured to determine the extent of the imperfections on the surface of the vehicle 202 based on a level of repair that may be required to address the imperfections. As another example, the artificial intelligence system 210 is configured to determine the extent of the imperfections on the surface of the vehicle 202 based on the one or more records and/or the sensor data. It is understood that the artificial intelligence system 210 is configured to determine the extent of the imperfections on the surface of the vehicle 202 based the one or more records, the sensor data, or a combination thereof.

The artificial intelligence system 210 is further configured to predict any subsequent build-up that may collect upon the surface of the vehicle 202. For example, the artificial intelligence system 210 is configured to predict any subsequent build-up that may collect or form upon the surface of the vehicle 202 based on one or more historical entries stored in a database 212 of the central edge server 206. As another example, the historical entries are based on previous determinations made by the artificial intelligence system 210 regarding the extent of the imperfections on the surface of the vehicle 202, previous records, previous sensor data entries, or a combination thereof.

The central edge server 206 adjusts one or more predefined robot cleaning paths of the one or more robots to provide additional cleaning to the highlighted areas upon the surface of the vehicle 202. For example, the central edge server 206 adjusts one or more predefined robot cleaning paths of the one or more robots based on the artificial intelligence system 210 determining that there is an excess level of build-up upon the surface of the vehicle 202. As yet another example, the central edge server 206 adjusts one or more predefined robot cleaning paths of the one or more robots based on the artificial intelligence system 210 predicting that there likely to be a subsequent excess level of build-up upon the surface of the vehicle 202. As an additional example, the one or more predefined robot cleaning paths of the one or more robots is associated with at least a first robotic tack-off workstation 110a of the duality of the robotic tack-off workstations 110a, 110b.

The vehicle 202 then progresses to a first imperfection sand/repair workstation 108a of the duality of imperfection sand/repair workstations 108a, 108b. The first imperfection sand/repair workstation 108a is a workstation that is configured to address any imperfections detected upon the surface of the vehicle 202. For example, in an instance wherein one or more imperfections are detected upon the surface of the vehicle 202, the surface of the vehicle 202 can be sanded (e.g., dry sanded) so that the one or more imperfections may be repaired. As an example, the central edge server 206 can cause for the first imperfection sand/repair workstation 108a to apply various pressures and/or various speeds of the sander to the surface of the vehicle 202 based on the sensor data received from the at least one sensor infrastructure 204 associated with the first imperfection sand/repair workstation 108a. As another example, the sensor data received from the at least one sensor infrastructure 204 associated with the first imperfection sand/repair workstation 108a is based on the one or more images acquired by the set of infrastructure sensors 208 associated with monitoring the progression of the vehicle 202 through the first imperfection sand/repair workstation 108a.

The vehicle 202 further progresses to the first robotic tack-off workstation 110a of the duality of the robotic tack-off workstations 110a, 110b. The first robotic tack-off workstation 110a is configured to enable one or more robots to clean any excess debris or build-up from the surface of the vehicle 202. For example, the one or more robots can be a sword brush cleaner. However, it is understood that any other type of cleaning machine may be used to clean the surface of the vehicle 202.

The one or more robots associated with the first robotic tack-off workstation 110a are configured to operate based on the predefined robot cleaning paths. For example, before the paint application process begins, the one or more robots are programmed to generically clean (e.g., cleaning the surface of the vehicle 202 without a consideration of a particular imperfection(s)) the entirety of the surface of the vehicle 202 at the outset of the example pathway 100. However, it is understood that the one or more robots can be programmed to clean the surface of the vehicle 202 in any way such as, but not limited to, a targeted means for cleaning the surface of the vehicle 202, a repetitive cleaning of certain areas of the surface of the vehicle 202, or a slower and/or faster method of cleaning the surface of the vehicle 202.

The one or more robots associated with the first robotic tack-off workstation 110a are further configured to operate based on any adjustments to the predefined robot cleaning paths in response to the artificial intelligence system 210 determining that there is an excess level of build-up upon the surface of the vehicle 202. The one or more robots associated with the first robotic tack-off workstation 110a are further configured to operate based on any adjustments to the predefined robot cleaning paths in response to the artificial intelligence system 210 predicting that there is likely to be a subsequent excess level of build-up upon the surface of the vehicle 202.

The vehicle 202 then progresses to the prime booth workstation 112. The prime booth workstation 112 is a workstation that is configured to apply a primer upon the surface of the vehicle 202. For example, the primer may be applied by a paint sprayer for uniform application across the surface of the vehicle 202. The central edge server 206 can cause for the prime booth workstation 112 to apply one or more layers of primer to the surface of the vehicle 202 based on the sensor data received from the at least one sensor infrastructure 204 associated with the prime booth workstation 112. As another example, the sensor data received from the at least one sensor infrastructure 204 associated with the prime booth workstation 112 is based on the one or more images acquired by the set of infrastructure sensors 208 associated with monitoring the progression of the vehicle 202 through the prime booth workstation 112.

The vehicle 202 then progresses to the prime oven workstation 114. The prime oven workstation 114 is a workstation that is configured to cure the primer applied to the surface of the vehicle 202 by baking the surface of the vehicle 202. For example, the bake time can be any duration. As another example, the baking process can occur at any temperature. As an additional example, the central edge server 206 can cause for the prime oven workstation 114 to vary temperatures of the baking process and/or bake times based on the sensor data received from the at least one sensor infrastructure 204 associated with the prime oven workstation 114. As another example, the sensor data received from the at least one sensor infrastructure 204 associated with the prime oven workstation 114 is based on the one or more images acquired by the set of infrastructure sensors 208 associated with monitoring the progression of the vehicle 202 through the prime oven workstation 114.

The vehicle 202 further progresses to a second inspection workstation 106b of the plurality of inspection workstations 106a-106c. Similar to the first inspection workstation 106a, the second inspection workstation 106b of the plurality of inspection workstations 106a-106c is configured to perform another inspection of the surface of the vehicle 202. The artificial intelligence system 210 is configured to determine an extent of any new imperfections (e.g., additional imperfections that have arisen since the vehicle 202 progressed through the first robotic tack-off workstation 110a and/or any unresolved imperfections) on the surface of the vehicle 202. For example, the artificial intelligence system 210 is configured to determine the extent of the new imperfections on the surface of the vehicle 202 based on a level of repair that may be required to address the new imperfections. As another example, the artificial intelligence system 210 is configured to determine the extent of the new imperfections on the surface of the vehicle 202 based on the one or more records and/or the sensor data. It is understood that the artificial intelligence system 210 is configured to determine the extent of the new imperfections on the surface of the vehicle 202 based the one or more records, the sensor data, the extent of the new imperfections on the surface of the vehicle 202, or a combination thereof.

The artificial intelligence system 210 is further configured to predict any subsequent build-up that may collect upon the surface of the vehicle 202 as the vehicle 202 progresses through the prime booth workstation 112 and the prime oven workstation 114. For example, the artificial intelligence system 210 is configured to predict any subsequent build-up that may collect upon the surface of the vehicle 202 based on one or more historical entries stored in a database 212 of the central edge server 206. As another example, the historical entries are based on previous determinations made by the artificial intelligence system 210 regarding the extent of the new imperfections on the surface of the vehicle 202, previous records, previous sensor data entries, or a combination thereof.

The central edge server 206 adjusts one or more predefined robot cleaning paths of the one or more robots based on the artificial intelligence system 210 determining that there is an excess level of build-up upon the surface of the vehicle 202. As yet another example, the central edge server 206 adjusts one or more predefined robot cleaning paths of the one or more robots based on the artificial intelligence system 210 predicting that there likely to be a subsequent excess level of build-up upon the surface of the vehicle 202. As an additional example, the one or more predefined robot cleaning paths of the one or more robots is associated with at least a second robotic tack-off workstation 110b of the duality of the robotic tack-off workstations 110a, 110b.

The vehicle 202 then progresses to a second imperfection sand/repair workstation 108b of the duality of imperfection sand/repair workstations 108a, 108b. The second imperfection sand/repair workstation 108b is a workstation that is configured to address the new imperfections detected upon the surface of the vehicle 202. For example, in an instance wherein one or more new imperfections are detected upon the surface of the vehicle 202, the surface of the vehicle 202 can be sanded (e.g., dry sanded) so that the one or more new imperfections may be repaired. As an example, the central edge server 206 can cause the second imperfection sand/repair workstation 108a to apply various pressures and/or various speeds of the sander to the surface of the vehicle 202 based on the sensor data received from the at least one sensor infrastructure 204 associated with the second imperfection sand/repair workstation 108b. As another example, the sensor data received from the at least one sensor infrastructure 204 associated with the second imperfection sand/repair workstation 108b is based on the one or more images acquired by the set of infrastructure sensors 208 associated with monitoring the progression of the vehicle 202 through the second imperfection sand/repair workstation 108b.

The vehicle 202 then progresses to the second robotic tack-off workstation 110b of the duality of the robotic tack-off workstations 110a, 110b. Similar to the first robotic tack-off workstation 110a, the second robotic tack-off workstation 110b is configured to enable the one or more robots to clean any excess debris or build-up from the surface of the vehicle 202. The one or more robots associated with the second robotic tack-off workstation 110b are further configured to operate based on any adjustments to the predefined robot cleaning paths based at least on the artificial intelligence system 210 determining that there is an excess level of build-up upon the surface of the vehicle 202 as the vehicle 202 progressed through at least the prime booth workstation 112 and the prime oven workstation 114. The one or more robots associated with the second robotic tack-off workstation 110b are further configured to operate based on any adjustments to the predefined robot cleaning paths based at least on the artificial intelligence system 210 predicting that there likely to be a subsequent excess level of build-up upon the surface of the vehicle 202 as the vehicle 202 progressed through at least the prime booth workstation 112 and the prime oven workstation 114.

The vehicle 202 then progresses to the enamel booth workstation 116. The enamel booth workstation 116 is a workstation that is configured to apply enamel paint upon the surface of the vehicle 202. For example, the enamel paint may be applied by another paint sprayer for uniform application across the surface of the vehicle 202. The central edge server 206 can cause for the enamel booth workstation 116 to apply one or more layers of enamel paint to the surface of the vehicle 202 based on the sensor data received from the at least one sensor infrastructure 204 associated with the enamel booth workstation 116. As another example, the sensor data received from the at least one sensor infrastructure 204 associated with the enamel booth workstation 116 is based on the one or more images acquired by the set of infrastructure sensors 208 associated with monitoring the progression of the vehicle 202 through the enamel booth workstation 116.

The vehicle 202 then progresses to the enamel oven workstation 118. The enamel oven workstation 118 is a workstation that is configured to cure the enamel paint applied to the surface of the vehicle 202 by baking the surface of the vehicle 202. For example, the bake time can be any duration. As another example, the baking process can occur at any temperature. As an additional example, the central edge server 206 can cause for the enamel oven workstation 118 to vary temperatures of the baking process and/or bake times based on the sensor data received from the at least one sensor infrastructure 204 associated with the enamel oven workstation 118. As another example, the sensor data received from the at least one sensor infrastructure 204 associated with the enamel oven workstation 118 is based on the one or more images acquired by the set of infrastructure sensors 208 associated with monitoring the progression of the vehicle 202 through the enamel oven workstation 118.

The vehicle 202 further progresses to a third inspection workstation 106c of the plurality of inspection workstations 106a-106c. Similar to the first and second inspection workstations 106a, 106b, the third inspection workstation 106c of the plurality of inspection workstations 106a-106c is configured to perform another inspection of the surface of the vehicle 202. The artificial intelligence system 210 is configured to determine an extent of any further imperfections (e.g., additional imperfections that have arisen since the vehicle 202 progressed through the second robotic tack-off workstation 110b and/or any unresolved imperfections) on the surface of the vehicle 202. For example, the artificial intelligence system 210 is configured to determine the extent of the further imperfections on the surface of the vehicle 202 based on a level of repair that may be required to address the further imperfections. As another example, the artificial intelligence system 210 is configured to determine the extent of the further imperfections on the surface of the vehicle 202 based on the one or more records and/or the sensor data. It is understood that the artificial intelligence system 210 is configured to determine the extent of the further imperfections on the surface of the vehicle 202 based the one or more records, the sensor data, the extent of the further imperfections on the surface of the vehicle 202, or a combination thereof.

The artificial intelligence system 210 is further configured to predict any subsequent build-up that may collect upon the surface of the vehicle 202 as the vehicle 202 progresses through the enamel booth workstation 116 and the enamel oven workstation 118. For example, the artificial intelligence system 210 is configured to predict any subsequent build-up that may collect upon the surface of the vehicle 202 based on one or more historical entries stored in a database 212 of the central edge server 206. As another example, the historical entries are based on previous determinations made by the artificial intelligence system 210 regarding the extent of the further imperfections on the surface of the vehicle 202, previous records, previous sensor data entries, or a combination thereof.

The central edge server 206 adjusts one or more predefined robot cleaning paths of the one or more robots based on the artificial intelligence system 210 determining that there is an excess level of build-up upon the surface of the vehicle 202. As yet another example, the central edge server 206 adjusts one or more predefined robot cleaning paths of the one or more robots based on the artificial intelligence system 210 predicting that there is likely to be a subsequent excess level of build-up upon the surface of the vehicle 202. As an additional example, the one or more predefined robot cleaning paths of the one or more robots is associated with at least the second robotic tack-off workstation 110b of the duality of the robotic tack-off workstations 110a, 110b.

The vehicle 202 then progresses to the imperfection moist sand/polish workstation 120. The imperfection moist sand/polish workstation 120 is a workstation that is configured to address any new and/or further imperfections detected upon the surface of the vehicle 202. For example, in an instance wherein one or more imperfections are detected upon the surface of the vehicle 202, the surface of the vehicle 202 can be sanded (e.g., wet sanded) so that the one or more imperfections may be polished. As an example, the central edge server 206 can cause for the imperfection moist sand/polish workstation 120 to apply various pressures and/or various speeds of the sander to the surface of the vehicle 202 based on the sensor data received from the at least one sensor infrastructure 204 associated with the imperfection moist sand/polish workstation 120. As another example, the sensor data received from the at least one sensor infrastructure 204 associated with the imperfection moist sand/polish workstation 120 is based on the one or more images acquired by the set of infrastructure sensors 208 associated with monitoring the progression of the vehicle 202 through the imperfection moist sand/polish workstation 120.

The central edge server 206 is also configured to determine whether the surface of the vehicle 202 is acceptable for distribution of the vehicle 202 for consumer use, for example. As another example, the artificial intelligence system 210 may also be configured to learn what a manual operator approves as acceptable for distribution of the vehicle 202 for consumer use so that the central edge server 206 can autonomously determine whether the surface of the vehicle 202 is acceptable for distribution of the vehicle 202 for consumer use. As a further example, the central edge server 206 may also be programmed with parameters that allows for the distribution of the vehicle 202 for consumer use only if an imperfection level is below a certain threshold (e.g., substantially non-existent).

In a case wherein the central edge server 206 determines that the surface of the vehicle 202 is not acceptable for distribution of the vehicle 202 for consumer use, the central edge server 206 can cause the vehicle 202 to progress back to the second robotic tack-off workstation 110b, the enamel booth workstation 116, the enamel oven workstation 118, the third inspection workstation 106c, and/or the imperfection moist sand/polish workstation 120. It is understood that while the vehicle 202 may be described as progressing through the one or more workstations of the paint application process in a particular order, the vehicle 202 may progress through the one or more workstations of the paint application process in any order. It is further understood that the paint application process may include any other workstations directed toward any other process associated with the paint application process.

FIG. 4 is a flowchart illustrating an example method 400 for optimizing a paint application process. At operation 402, a first set of data is received. For example, the first set of data is received from a first inspection workstation (e.g., the first inspection workstation 106a). It is understood, however that the first set of data may be received from any inspection workstation (e.g., the second inspection workstation 106b and/or the third inspection workstation 106c). As another example, the first set of data is associated with a surface condition of a vehicle (e.g., the vehicle 202). As a further example, the first set of data includes an amount of imperfections associated with the first instance of the one or more imperfections, a size of each imperfection of the first instance of the one or more imperfections, a location of each imperfection of the first instance of the one or more imperfections, or a combination thereof.

At operation 404, an extent of a first instance of one or more imperfections upon a surface of the vehicle is determined. For example, the extent of the first instance of the one or more imperfections upon the surface of the vehicle is determined by an artificial intelligence system. As another example, the determination of the extent of the first instance of the one or more imperfections upon the surface of the vehicle is based on the first set of data.

At operation 406, a pathway followed by one or more robots is updated. For example, the pathway followed by the one or more robots is updated based on the determination of the extent of the first instance of the one or more imperfections, as described herein. As another example, the update to the pathway causes the one or more robots to initiate a remediation action to a targeted portion of the surface of the vehicle to resolve the first instance of the one or more imperfections, as described herein. That is, the remediation action removes the first instance of the one or more imperfections, for example. As an additional example, the remediation action includes a sanding process, a polishing process, or a combination thereof, and wherein the first instance and a second instance of the one or more imperfections comprises a portion of the surface of the vehicle that include excess dust, excess dirt, excess debris, or a combination thereof.

As yet another example, the update to the pathway can include the insertion of an additional cleaning step. As another example, in the instance wherein each step of the paint application process is predefined, the artificial intelligence system 210 can add an additional cleaning step based on the sensor data. Furthermore, the central edge server 206 can be configured to cause the vehicle 202 to pause progression through the paint application process, stop progression through the paint application process, and/or re-route through the paint application process (e.g., travel to another workstation instead of the workstation that was predefined as part of the paint application process). For example, the central edge server 206 is configured to cause the vehicle 202 to pause progression through the paint application process, stop progression through the paint application process, and/or re-route through the paint application process via a transmission of one or more instructions and/or one or more signals to the vehicle 202. As another example, in an instance wherein the vehicle 202 is an autonomous vehicle that is being remotely marshaled through the paint shop process, the one or more instructions and/or one or more signals received from the central edge server 206 can cause the vehicle 202 to pause progression through the paint application process, stop progression through the paint application process, and/or re-route through the paint application process. As an additional example, in an instance wherein the vehicle 202 is a hybrid-autonomous vehicle or not autonomous at all, the one or more instructions and/or one or more signals received from the central edge server 206 can prompt an operator of the vehicle 202 to manually cause the vehicle 202 to pause progression through the paint application process, stop progression through the paint application process, and/or re-route through the paint application process. As a further example, the update to the pathway can include any adjustments to the predefined robot cleaning paths based at least on the artificial intelligence system 210 determining that there is an excess level of build-up upon the surface of the vehicle 202.

In an example embodiment, an amount of debris that will be generated by the remediation action is predicted. For example, the amount of debris that will be generated by the remediation action is predicted by the artificial intelligence system. As yet another example, the update to the pathway followed by the one or more robots is further based on the predicted amount of debris. It is understood that the update to the pathway followed by the one or more robots is based on the determination of the extent of the first instance of the one or more imperfections and/or the predicted amount of debris.

In another example embodiment, a second set of data is received. For example, the second of data is received from a second inspection workstation. As another example, the second set of data is associated with the surface condition of the vehicle. As an additional example, an extent of the second instance of one or more imperfections upon the surface of the vehicle is determined. For example, the extent of the second instance of one or more imperfections upon the surface of the vehicle is determined by the artificial intelligence system. As another example, the determination of the extent of the second instance of one or more imperfections upon the surface of the vehicle is based on the second set of data. As yet another example, the determination of the extent of the second instance of one or more imperfections upon the surface of the vehicle is based on a predicted amount of debris that will be generated by the remediation action. It is understood that the determination of the extent of the second instance of one or more imperfections upon the surface of the vehicle is based on the second set of data and/or the predicted amount of debris that will be generated by the remediation action. As an additional example, the pathway followed by the one or more robots is updated. For example, the pathway followed by the one or more robots is updated based on the determination of the extent of the second instance of the one or more imperfections. As another example, the update to the pathway causes the one or more robots to initiate the remediation action to at least one of the targeted portion or another targeted portion of the surface of the vehicle to resolve the second instance of the one or more imperfections. That is, the remediation action removes the second instance of the one or more imperfections, for example. As a further example, the second set of data includes an amount of imperfections associated with the second instance of the one or more imperfections, a size of each imperfection of the second instance of the one or more imperfections, a location of each imperfection of the first instance of the one or more imperfections, or a combination thereof.

Figure 5:
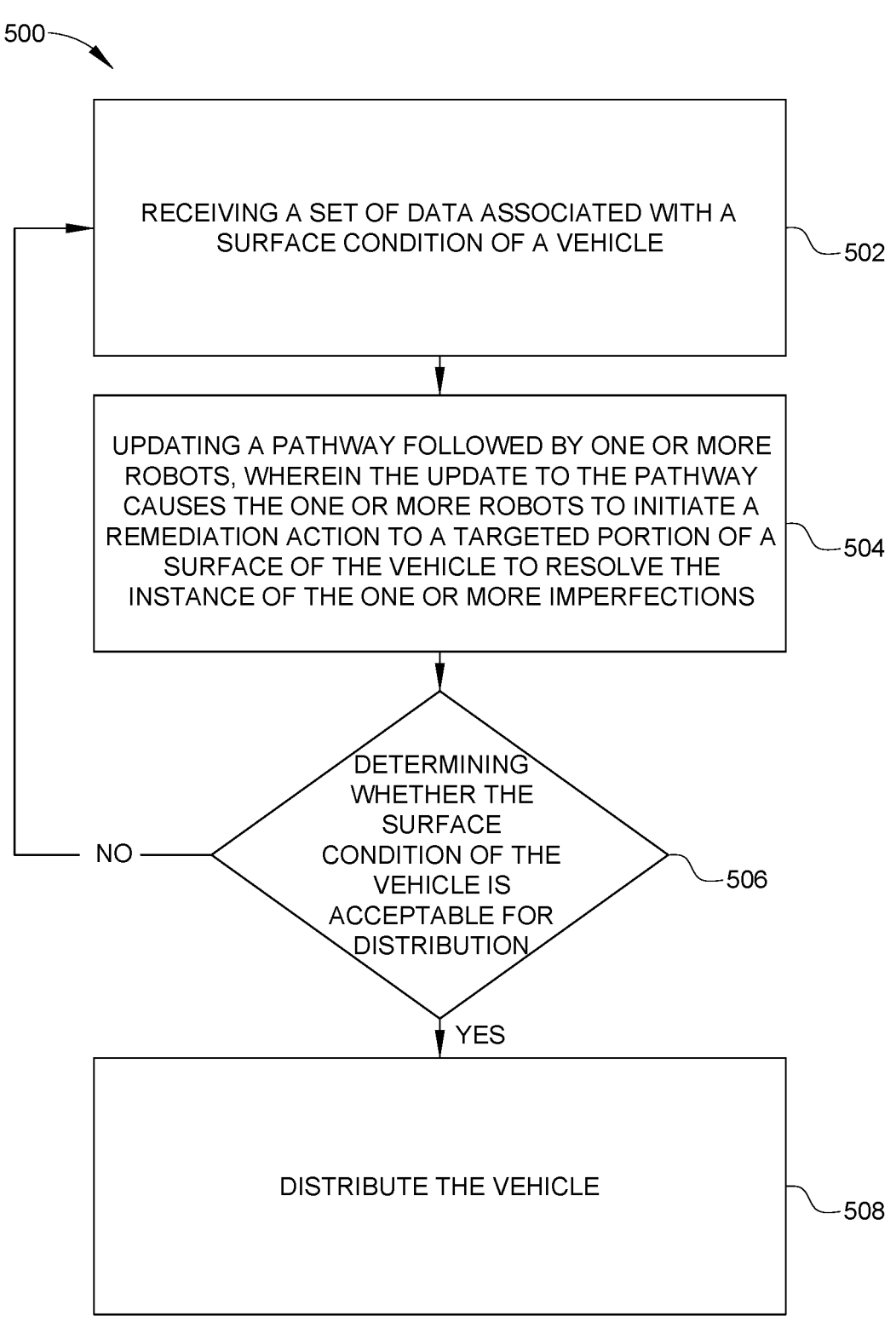
FIG. 5 is a flowchart illustrating another example method for a paint application process in accordance with various implementations.

FIG. 5 is a flowchart illustrating an example method 500 for a paint application process. At operation 502, a set of data is received. For example, the set of data is associated with a surface condition of a vehicle (e.g., the vehicle 202). As another example, the set of data is received by an inspection workstation (e.g., the plurality of workstations 106a-106c). At operation 504, a pathway followed by one or more robots is updated. For example, the pathway is updated based on a determination of an extent of an instance of one or more imperfections. As another example, the update to the pathway can cause the one or more robots to initiate a remediation action to a targeted portion of a surface of the vehicle to resolve the instance of the one or more imperfections. That is, the remediation action removes the one or more imperfections, for example.

At operation 506, a determination is made regarding whether the surface condition of the vehicle is acceptable for distribution. In an instance wherein the surface condition of the vehicle is acceptable for distribution, the vehicle is distributed for consumer use at operation 508. However, in an instance wherein the surface condition of the vehicle is not acceptable for distribution, each of the operations of the example method 500 are repeated until the surface condition of the vehicle is acceptable for distribution for consumer use, as described in more detail herein.

Thus, one or more examples of the present disclosure provide a means for optimizing a paint application process. For example, through the use of an artificial intelligence system (e.g., the artificial intelligence system 210), targeted cleaning efforts may be applied to the surface of a vehicle (e.g., the vehicle 202) as the vehicle progresses through one or more workstations associated with the paint application process.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   receiving, from a first inspection workstation, a first set of data associated with a surface condition of a vehicle;
   determining, by an artificial intelligence system, an extent of a first instance of one or more imperfections upon a surface of the vehicle based on the first set of data;
   updating a pathway followed by one or more robots based on the determination of the extent of the first instance of the one or more imperfections, wherein the update to the pathway causes the one or more robots to initiate a remediation action to a targeted portion of the surface of the vehicle to resolve the first instance of the one or more imperfections; and
   predicting an amount of debris that will be generated by the remediation action.

2. The method of claim 1, wherein the first set of data includes an amount of imperfections associated with the first instance of the one or more imperfections, a size of each imperfection of the first instance of the one or more imperfections, a location of each imperfection of the first instance of the one or more imperfections, or a combination thereof.

3. The method of claim 1, further comprising:
   predicting the amount of debris that will be generated by the remediation action using the artificial intelligence system.

4. The method of claim 3, wherein the update to the pathway followed by the one or more robots is further based on the predicted amount of debris.

5. The method of claim 1, further comprising:
   receiving, from a second inspection workstation, a second set of data associated with the surface condition of the vehicle;
   determining, by the artificial intelligence system, an extent of a second instance of one or more imperfections upon the surface of the vehicle based on the second set of data and a predicted amount of debris that will be generated by the remediation action; and
   updating the pathway followed by the one or more robots based on the determination of the extent of the second instance of the one or more imperfections, wherein the update to the pathway causes the one or more robots to initiate the remediation action to at least one of the targeted portion or another targeted portion of the surface of the vehicle to resolve the second instance of the one or more imperfections.

6. The method of claim 5, wherein the second set of data includes an amount of imperfections associated with the second instance of the one or more imperfections, a size of each imperfection of the second instance of the one or more imperfections, a location of each imperfection of the first instance of the one or more imperfections, or a combination thereof.

7. The method of claim 5, wherein the remediation action includes a sanding process, a polishing process, or a combination thereof, and wherein the first instance and the second instance of the one or more imperfections comprises a portion of the surface of the vehicle that include excess dust, excess dirt, excess debris, or a combination thereof.

8. A system comprising:
   an infrastructure system configured to:
   receive, from a first inspection workstation, a first set of data associated with a surface condition of a vehicle,
   determine, by an artificial intelligence system, an extent of a first instance of one or more imperfections upon a surface of the vehicle based on the first set of data, update a pathway followed by one or more robots based on the determination of the extent of the first instance of the one or more imperfections;

predict an amount of debris that will be generated by a remediation action;

the first inspection workstation configured to:

identify the first set of data, and send the first set of data to the infrastructure system; and the one or more robots configured to:

initiate the remediation action to a targeted portion of the surface of the vehicle to resolve the first instance of the one or more imperfections based on the update to the pathway.

9. The system of claim 8, wherein the first set of data includes an amount of imperfections associated with the first instance of the one or more imperfections, a size of each imperfection of the first instance of the one or more imperfections, a location of each imperfection of the first instance of the one or more imperfections, or a combination thereof.

10. The system of claim 8, wherein the infrastructure system is further configured to:

predict the amount of debris that will be generated by the remediation action using the artificial intelligence system.

11. The system of claim 10, wherein the update to the pathway followed by the one or more robots is further based on the predicted amount of debris.

12. The system of claim 8, wherein the infrastructure system is further configured to:

receive, from a second inspection workstation, a second set of data associated with the surface condition of the vehicle;

determine, by the artificial intelligence system, an extent of a second instance of one or more imperfections upon the surface of the vehicle based on the second set of data and a predicted amount of debris that will be generated by the remediation action; and update the pathway followed by the one or more robots based on the determination of the extent of the second instance of the one or more imperfections, wherein the update to the pathway causes the one or more robots to initiate the remediation action to at least one of the targeted portion or another targeted portion of the surface of the vehicle to resolve the second instance of the one or more imperfections.

13. The system of claim 12, wherein the second set of data includes an amount of imperfections associated with the second instance of the one or more imperfections, a size of each imperfection of the second instance of the one or more imperfections, a location of each imperfection of the first instance of the one or more imperfections, or a combination thereof.

14. The system of claim 12, wherein the remediation action includes a sanding process, a polishing process, or a combination thereof, and wherein the first instance and the second instance of the one or more imperfections comprises a portion of the surface of the vehicle that include excess dust, excess dirt, excess debris, or a combination thereof.

15. One or more non-transitory computer-readable media storing processor-executable instructions that, when executed by at least one processor, cause the at least one processor to:

receive, from a first inspection workstation, a first set of data associated with a surface condition of a vehicle;

determine, by an artificial intelligence system, an extent of a first instance of one or more imperfections upon a surface of the vehicle based on the first set of data;

update a pathway followed by one or more robots based on the determination of the extent of the first instance of the one or more imperfections, wherein the update to the pathway causes the one or more robots to initiate a remediation action to a targeted portion of the surface of the vehicle to resolve the first instance of the one or more imperfections; and predict an amount of debris that will be generated by the remediation action.

16. The one or more non-transitory computer-readable media of claim 15, wherein the first set of data includes an amount of imperfections associated with the first instance of the one or more imperfections, a size of each imperfection of the first instance of the one or more imperfections, a location of each imperfection of the first instance of the one or more imperfections, or a combination thereof.

17. The one or more non-transitory computer-readable media of claim 15, wherein the at least one processor is further caused to:

predict the amount of debris that will be generated by the remediation action using the artificial intelligence system, wherein the update to the pathway followed by the one or more robots is further based on the predicted amount of debris.

18. The one or more non-transitory computer-readable media of claim 15, wherein the at least one processor is further caused to:

receive, from a second inspection workstation, a second set of data associated with the surface condition of the vehicle;

determine, by the artificial intelligence system, an extent of a second instance of one or more imperfections upon the surface of the vehicle based on the second set of data and a predicted amount of debris that will be generated by the remediation action; and update the pathway followed by the one or more robots based on the determination of the extent of the second instance of the one or more imperfections, wherein the update to the pathway causes the one or more robots to initiate the remediation action to at least one of the targeted portion or another targeted portion of the surface of the vehicle to resolve the second instance of the one or more imperfections.

19. The one or more non-transitory computer-readable media of claim 18, wherein the second set of data includes an amount of imperfections associated with the second instance of the one or more imperfections, a size of each imperfection of the second instance of the one or more imperfections, a location of each imperfection of the first instance of the one or more imperfections, or a combination thereof.

20. The one or more non-transitory computer-readable media of claim 18, wherein the remediation action includes a sanding process, a polishing process, or a combination thereof, and wherein the first instance and the second instance of the one or more imperfections comprises a portion of the surface of the vehicle that include excess dust, excess dirt, excess debris, or a combination thereof.

* * * * *